(12) United States Patent
Li

(10) Patent No.: US 11,231,605 B2
(45) Date of Patent: Jan. 25, 2022

(54) DISPLAY DEVICE COMPRISING SWITCHABLE ANTI-PEEPING DEVICE WITH LIGHT ORIENTATION LAYER

(71) Applicant: BOE Technology Group Co., Ltd., Beijing (CN)

(72) Inventor: Wenbo Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/677,119

(22) Filed: Nov. 7, 2019

(65) Prior Publication Data

US 2020/0073158 A1 Mar. 5, 2020

Related U.S. Application Data

(62) Division of application No. 15/534,301, filed as application No. PCT/CN2016/087063 on Jun. 24, 2016, now abandoned.

(30) Foreign Application Priority Data

Feb. 19, 2016 (CN) .......................... 201610094364.X

(51) Int. Cl.
*G02F 1/13* (2006.01)
*G02F 1/1334* (2006.01)
(Continued)

(52) U.S. Cl.
CPC .......... *G02F 1/1323* (2013.01); *G02F 1/1334* (2013.01); *G02F 1/1337* (2013.01);
(Continued)

(58) Field of Classification Search
CPC combination set(s) only.
See application file for complete search history.

(56) References Cited

U.S. PATENT DOCUMENTS

| 5,561,440 A | 10/1996 | Kitajima et al. |
| 6,392,735 B1 | 5/2002 | Tani |

(Continued)

FOREIGN PATENT DOCUMENTS

| CN | 1621928 A | 6/2005 |
| CN | 1866084 A | 11/2006 |

(Continued)

OTHER PUBLICATIONS

Nov. 10, 2016—(WO) International Search Report and Written Opinion Appn PCT/CN2016/087063 with English Tran.

(Continued)

*Primary Examiner* — Lauren Nguyen
(74) *Attorney, Agent, or Firm* — Banner & Witcoff, Ltd.

(57) ABSTRACT

A switchable anti-peeping device and a manufacturing method thereof, and a display device are provided. The switchable anti-peeping device, including a first substrate and a second substrate provided opposed to each other and a light control layer therebetween, wherein the first substrate includes a first base substrate, and a first light orientation layer and a first electrode layer which are provided on the first base substrate, and the second substrate includes a second base substrate, and a second electrode layer provided on the second base substrate, and the first light orientation layer defines an angle of emergence of light passing through the first light orientation layer, and the light control layer is capable of switching between a transparent state and a scattering state. The switchable anti-peeping device can achieve switching between a wide viewing angle and a narrow viewing angle, thereby meeting real-time requirements of people in different situations.

2 Claims, 7 Drawing Sheets

(51) Int. Cl.
*G02F 1/29* (2006.01)
*G02F 1/1335* (2006.01)
*G02F 1/1337* (2006.01)
*G02F 1/1343* (2006.01)
*G02F 1/13357* (2006.01)
*G02F 1/1347* (2006.01)

(52) U.S. Cl.
CPC ........ *G02F 1/1343* (2013.01); *G02F 1/13476* (2013.01); *G02F 1/133512* (2013.01); *G02F 1/133528* (2013.01); *G02F 1/133606* (2013.01); *G02F 1/29* (2013.01); *G02F 1/133524* (2013.01); *G02F 1/133548* (2021.01)

(56) References Cited

U.S. PATENT DOCUMENTS

| | | |
|---|---|---|
| 2002/0180909 A1 | 12/2002 | Lubart et al. |
| 2004/0144754 A1 | 7/2004 | Itami et al. |
| 2006/0262057 A1* | 11/2006 | Sumiyoshi ........... G09G 3/3614 345/87 |
| 2007/0268586 A1 | 11/2007 | Mimura et al. |
| 2010/0026937 A1* | 2/2010 | Okazaki ................ G02F 1/1323 349/78 |
| 2011/0310085 A1 | 12/2011 | Mimura et al. |
| 2014/0028956 A1 | 1/2014 | Choi et al. |
| 2014/0293187 A1* | 10/2014 | Nam ................. G02F 1/133528 349/62 |
| 2016/0202552 A1* | 7/2016 | Ahn ..................... G02B 5/3058 349/122 |

FOREIGN PATENT DOCUMENTS

| | | |
|---|---|---|
| CN | 1928662 A | 3/2007 |
| CN | 101187749 A | 5/2008 |
| CN | 104808410 A | 7/2015 |
| CN | 105549236 A | 5/2016 |
| JP | 09244018 A | 9/1997 |

OTHER PUBLICATIONS

Jul. 16, 2019—(EP) Extended Search Report for application EP 16890309.4.

* cited by examiner

DISPLAY DEVICE COMPRISING SWITCHABLE ANTI-PEEPING DEVICE WITH LIGHT ORIENTATION LAYER

CROSS-REFERENCE

The application is a divisional of U.S. patent application Ser. No. 15/534,301, filed on Jun. 8, 2017, which is a U.S. National Phase Entry of International Application PCT/CN2016/087063 filed on Jun. 24, 2016, claiming priority to Chinese Patent Application No. 201610094364.X, filed on Feb. 19, 2016. The present application claims priority to and the benefit of the above-identified applications and the above-identified applications are incorporated by reference herein in their entirety.

TECHNICAL FIELD

At least one embodiment of the present disclosure relates to a switchable anti-peeping device and a manufacturing method thereof, and a display device.

BACKGROUND

A typical anti-peeping technology includes a glasses type and a naked eye type, the anti-peeping technology of the glasses type performs separation protection of confidential information by an auxiliary external device, and the anti-peeping technology of the naked eye type achieves anti-peeping by controlling an angle of incident light which is incident on a display panel.

However, a technology for achieving switching between anti-peeping and normal display is relatively rare; by using a directional backlight technology, switching between a wide viewing angle and a narrow viewing angle can be achieved, but this technology poses an extremely high requirement on fabrication of a light guide plate and a light source, and it is difficult for an ordinary backlight manufacturer to meet a design requirement. The light source includes, for example, an organic light emitting diode (LED) lighting bar. However, with an anti-peeping film, only anti-peeping display can be achieved, and anti-peeping switching can be achieved by combining with other auxiliary device, but costs of the anti-peeping film and the auxiliary device are both high, and there is greater difficulty for mass production.

SUMMARY

At least one embodiment of the present disclosure relates to a switchable anti-peeping device and a manufacturing method thereof, and a display device, the switchable anti-peeping device can achieve switching between a wide viewing angle and a narrow viewing angle, thereby meeting real-time requirements of people in different situations.

At least one embodiment of the present disclosure provides a switchable anti-peeping device, including a first substrate and a second substrate provided opposed to each other and a light control layer located between the first substrate and the second substrate, wherein the first substrate includes a first base substrate, and a first light orientation layer and a first electrode layer which are provided on the first base substrate, and the second substrate includes a second base substrate, and a second electrode layer provided on the second base substrate, and the first light orientation layer defines an angle of emergence of light passing through the first light orientation layer, and the light control layer is capable of switching between a transparent state and a scattering state.

At least one embodiment of the present disclosure provides a display device, including a display panel, a backlight module, and any one of the switchable anti-peeping devices provided by the embodiments of the present disclosure, wherein the switchable anti-peeping device is located between the backlight module and the display panel.

At least one embodiment of the present disclosure provides a manufacturing method of a switchable anti-peeping device, including: forming a first light orientation layer and a first electrode layer on a first base substrate to prepare a first substrate, the first light orientation layer defining an angle of emergence of light passing through the first light orientation layer; forming a second electrode layer on a second base substrate to prepare a second substrate; and providing a light control layer between the first substrate and the second substrate, and the light control layer being capable of switching between a transparent state and a scattering state.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the invention.

REFERENCE NUMERALS

Figure 1:
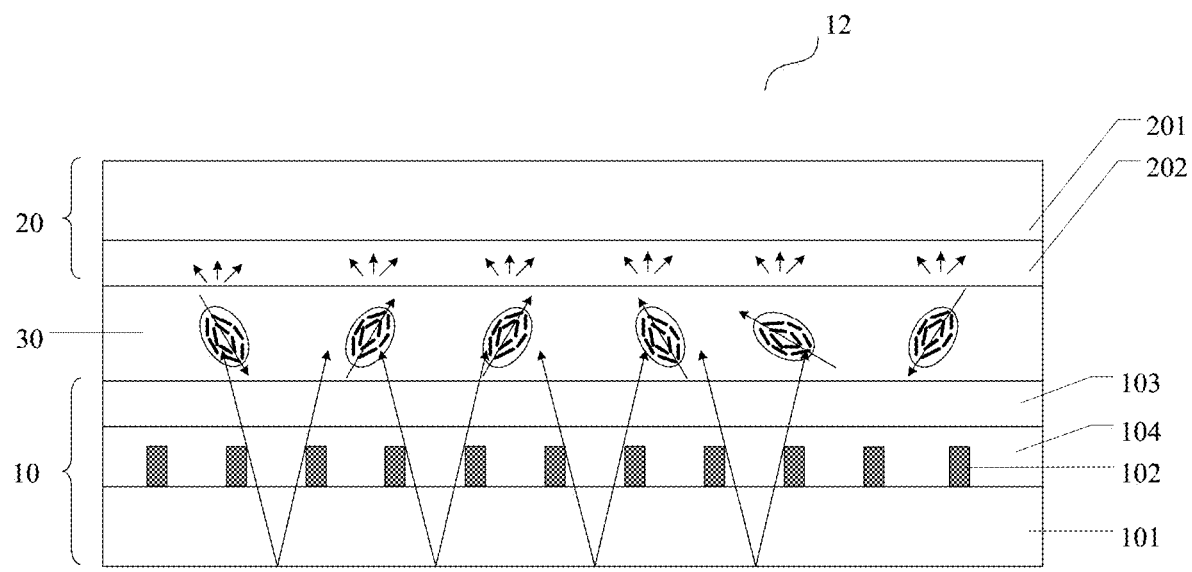
FIG. 1 is a schematic diagram (a schematic diagram of a wide-viewing-angle optical path principle) of a switchable anti-peeping device provided by an embodiment of the present disclosure.

12—switchable anti-peeping device; 10—first substrate; 20—second substrate; 30—light control layer; 40—conductive structure; 50—sealing structure; 101—first base substrate; 102—first light orientation layer; 1021—first barrier; 103—first electrode layer; 104—insulating layer; 105—second light orientation layer; 1051—second barrier; 201—second base substrate; 202—second electrode layer; 106—wring; 67—display panel; 60—lower substrate; 601—wire grid polarizing film; 70—upper substrate; 701—black matrix pattern; 76—liquid crystal layer; 89—backlight module; 891—light guide plate; 892—light source; 893—diffusion film; 894—prism film; 895—reflection plate; 7011—first black matrix; 7012—second black matrix; 90—sub-pixel; 1023—first light orientation film; 1026—first photoresist; 1028—patterned first photoresist.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "include," "including," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but can include an electrical connection, directly or indirectly. "On," "under," "right," "left" and the like are only used to indicate relative position relationship, and when the position of the object which is described is changed, the relative position relationship can be changed accordingly.

It should be noted that, the photoetching process in the embodiments of the present disclosure, for example, refers to a technical process including film formation, exposure, development and so on, and forming a pattern by using photoresist, a mask, an exposure machine, and so on.

At least one embodiment of the present disclosure provides a switchable anti-peeping device, including a first substrate and a second substrate provided opposed to each other and a light control layer located between the first substrate and the second substrate, the first substrate including a first base substrate, and a first light orientation layer and a first electrode layer which are provided on the first base substrate, the second substrate including a second base substrate and a second electrode layer provided on the second base substrate, the first light orientation layer defining an angle of emergence of light passing through the first light orientation layer, and the light control layer being capable of switching between a transparent state and a scattering state. The switchable anti-peeping device can achieve switching between a wide viewing angle and a narrow viewing angle by one click, thereby meeting real-time requirements of people in different situations; when it is necessary to share information with others, a wide viewing angle (normal display) mode can be used; and when it is necessary to use privately or confidentially, a narrow viewing angle (anti-peeping) mode can be used, which has a strong economic value and market value.

At least one embodiment of the present disclosure further provides a manufacturing method of a switchable anti-peeping device, the method including: forming a first light orientation layer and a first electrode layer on a first base substrate to prepare a first substrate, the first light orientation layer defining an angle of emergence of light passing through the first light orientation layer; forming a second electrode layer on a second base substrate to prepare a second substrate; providing a light control layer between the first substrate and the second substrate, the light control layer being capable of switching between a transparent state and a scattering state. For the manufacturing method of the switchable anti-peeping device, a liquid crystal display (LCD) production line process can be used, which can utilize the production line's own apparatus and process to a large extent, and reduce product costs.

Hereinafter, it is illustrated with reference to several embodiments.

First Embodiment

This embodiment provides a switchable anti-peeping device 12, as illustrated in FIG. 1, including a first substrate 10 and a second substrate 20 provided opposed to each other and a light control layer 30 located between the first substrate 10 and the second substrate 20, wherein the first substrate 10 includes a first base substrate 101, and a first light orientation layer 102 and a first electrode layer 103 which are provided on the first base substrate 101, the second substrate 20 includes a second base substrate 201, and a second electrode layer 202 provided on the second base substrate 201, the first light orientation layer 102 defines an angle of emergence of light passing through (coming out of) the first light orientation layer 102, and the light control layer 30 is capable of switching between a transparent state and a scattering state. For example, the light control layer includes a liquid crystal light control layer, but is not limited thereto. For example, the first light orientation layer 102 defines the angle of emergence of the light passing through the first light orientation layer 102 to be less than 180°. For example, in a case where an electric field is formed between the first electrode layer 103 and the second electrode layer 202, the light control layer 30 is in the transparent state. In a case where there is no electric field between the first electrode layer 103 and the second electrode layer 202, the light control layer 30 is in the scattering state. The angle of emergence of the light passing through the switchable anti-peeping device 12 just corresponds to an incident angle of light which is incident on the display panel. For example, the first base substrate 101 and the second base substrate 201 can include a glass substrate or a resin substrate, but are not limited thereto.

Referring to FIG. 1, the light control layer 30 is in the scattering state, although light that is incident on the switchable anti-peeping device passing through the first light orientation layer 102 has its angle of emergence limited, yet after the light whose angle of emergence is limited passes through the light control layer 30 in the scattering state, orientation light is uniformly scattered, and the angle of emergence is no longer limited, but is emitted in all directions, and thereby, the light passing through the switchable anti-peeping device becomes non-orientation light, so that a displayed screen of a display device including the switchable anti-peeping device 12 is a wide viewing angle (a non-narrow viewing angle) screen, which achieves wide viewing angle display, and presents a non-anti-peeping state. In this state, there is no electric field between the first electrode layer 103 and the second electrode layer 202, and no voltage can be applied to the first electrode layer 103 and the second electrode layer 202, or the first electrode layer 103 and the second electrode layer 202 are equal potential.

Figure 2:
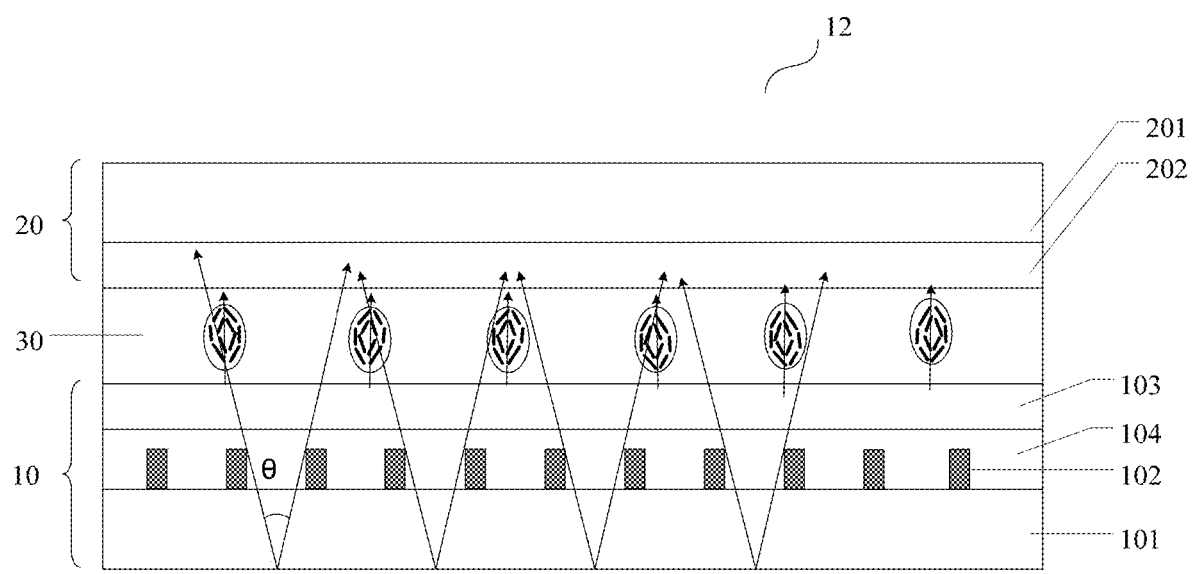
FIG. 2 is a schematic diagram (a schematic diagram of a narrow-viewing-angle optical path principle) of a switchable anti-peeping device provided by an embodiment of the present disclosure.

Referring to FIG. 2, the light control layer 30 is in the transparent state, after the light that is incident on the switchable anti-peeping device 12 passes through the first light orientation layer 102, the angle of emergence is limited, and after the light whose angle of emergence is limited passes through the light control layer 30 in the transparent state, the angle of emergence is still limited. Thereby, light passing through the switchable anti-peeping device becomes orientation light, so that the displayed screen of the display device including the switchable anti-peeping device 12 is a narrow viewing angle screen, which achieves narrow viewing angle display, and presents an anti-peeping state. Thus, an electric field or no electric field is formed between the first electrode layer 103 and the second electrode layer 202, so that the light control layer 30 switches between the transparent state and the scattering state, and so that the display device including the switchable anti-peeping device 12 switches between the anti-peeping state and the non-anti-peeping state.

For example, in the switchable anti-peeping device provided by an example of this embodiment, a liquid crystal light control film can be used for the light control layer 30; for example, a polymer dispersed liquid crystal (PDLC) can be used, and the PDLC can be mainly operated in the transparent state or the scattering state. For example, a low molecular liquid crystal and prepolymer glue are mixed, which, after polymerization reaction, form micrometer-scale liquid crystal droplets evenly dispersed in a polymer network, and then dielectric anisotropy of the liquid crystal molecule is used for obtaining a material having an electro-optic characteristic, which is just the PDLC. It should be noted that, the material of the liquid crystal light control layer is not limited thereto, as long as it is a liquid crystal capable of switching between the transparent state and the scattering state. For example, the liquid crystal in the light control layer 30 can be a smectic liquid crystal, but is not limited thereto.

Figure 3:
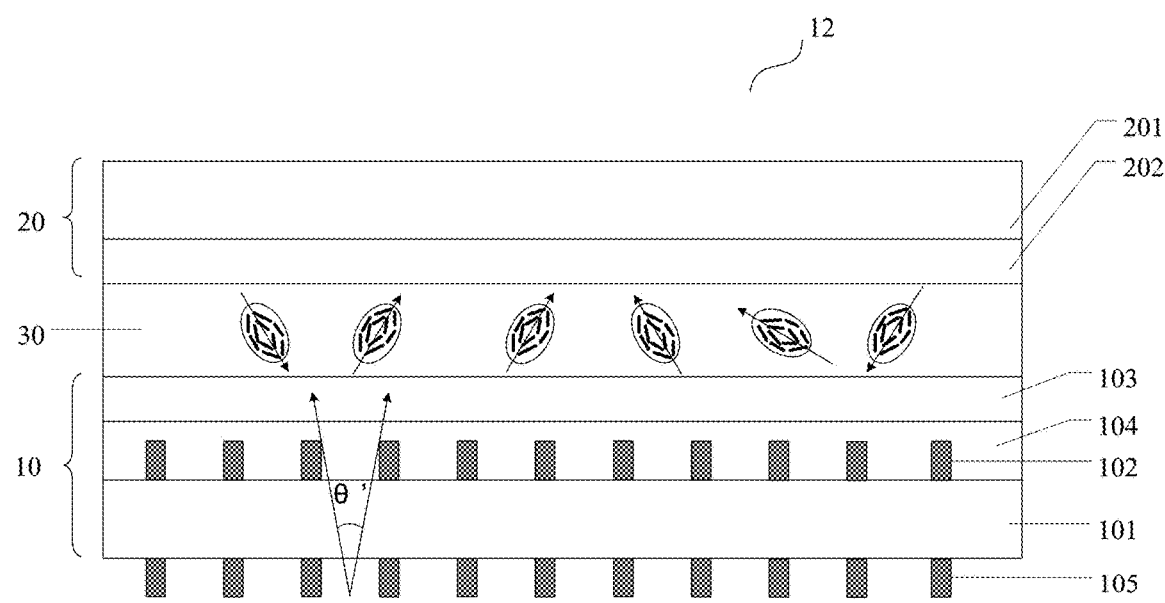
FIG. 3 is a schematic diagram of another switchable anti-peeping device provided by an embodiment of the present disclosure.
Figure 4:
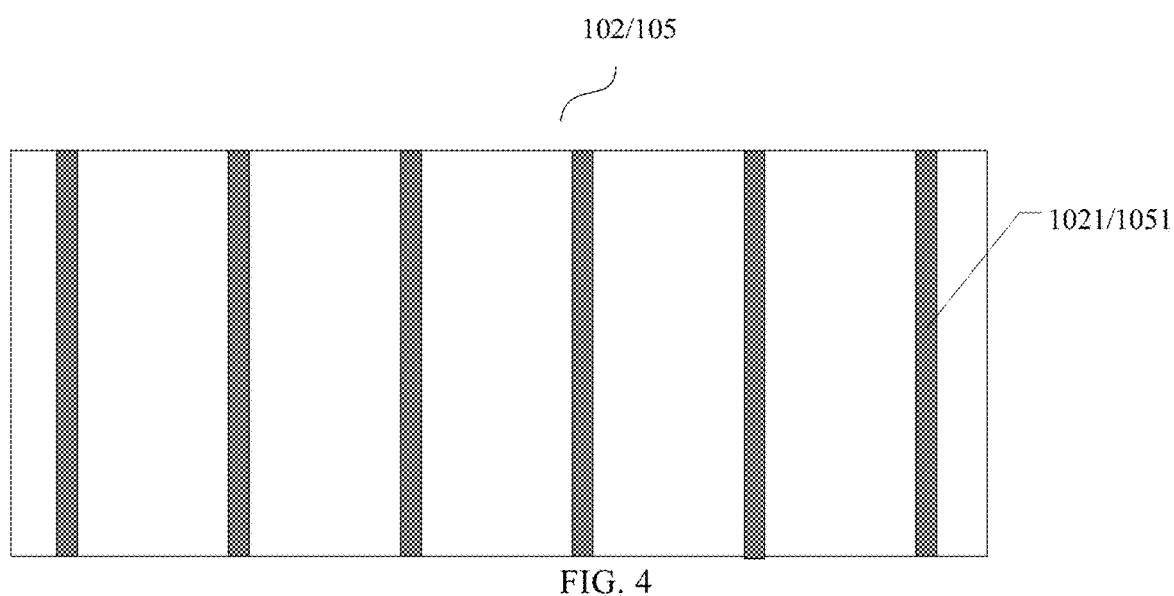
FIG. 4 is a plan schematic diagram of a first light orientation layer or a second light orientation layer in a switchable anti-peeping device provided by an embodiment of the present disclosure.

For example, as illustrated in FIG. 3, in the switchable anti-peeping device provided by an example of this embodiment, a second light orientation layer 105 is further provided on a side of the first base substrate 101 opposite to a side of the first base substrate 101 on which the first light orientation layer 102 is provided, and the second light orientation layer 105 defines an angle of emergence of light passing through (coming out of) the second light orientation layer 105. For example, the second light orientation layer 105 defines the angle of emergence of the light passing through the second light orientation layer 105 to be less than 180°. The second light orientation layer 105 is employed to limit the angle of emergence of the light and improve a directional effect of the light. In this example, it is illustrated with a case where the first light orientation layer 102 is located on a side of the first base substrate towards the second substrate, and the second light orientation layer 105 is located on a side of the first base substrate away from the second substrate, but is not limited thereto. For example, in a case where only the first light orientation layer 102 is included, the first light orientation layer 102 can also be located on the side of the first base substrate away from the second substrate. It should be noted that, the second light orientation layer 105 can also be provided on a same side of the first base substrate 101, which will not be limited by the embodiment of the present disclosure, For example, as illustrated in FIG. 4, in the switchable anti-peeping device provided by an example of this embodiment, the first light orientation layer 102 includes a plurality of first barriers 1021 parallel to each other. It should be noted that, it is not limited to the number of the first barriers 1021 illustrated in the diagram, and FIG. 4 is only schematic description. As long as the first barriers 1021 can define the angle of emergence of the light passing through the first light orientation layer 102, it is not limited to the case where the first barriers 1021 are parallel to each other. For example, it can be other shapes, which will not be limited in this embodiment. For example, the angle of emergence of the light passing through the first light orientation layer 102 can be adjusted by adjusting a height of the first barriers 1021 and/or the angle of emergence of the light passing through the first light orientation layer 102 can be adjusted by adjusting a distance between two adjacent first barriers 1021. For example, it is possible to define an angle of emergence θ (as illustrated in FIG. 2) of the light passing through the first light orientation layer 102 within 60°, further, for example, within 45°, and more further, for example, within 30°, which is not limited thereto. For example, the angle of emergence θ refers to a maximum angle of emergence after emergent light passing through an intersection between a center line of a distance between two adjacent first barriers and a side of the first base substrate away from the second base substrate, passes through the two adjacent first barriers. For example, the angle of emergence θ can also refer to a maximum included angle of the emergent light passing through two adjacent first barriers.

For example, as illustrated in FIG. 4, in the switchable anti-peeping device provided by an example of this embodiment, the second light orientation layer 105 includes a plurality of second barriers 1051 parallel to each other. As long as the second barrier 1051 can define the angle of emergence of the light passing through the first light orientation layer, it is not limited to the case where the second barriers 1051 are parallel to each other; for example, it can be other shapes, which will not be limited in this embodiment. As illustrated in FIG. 3, a projection of the first barriers 1021 on the first base substrate 101 can coincide with a projection of the second barriers 1051 on the first base substrate 101. With such arrangement, it is easy to fabricate, for example, in a case of manufacturing by using a photo-etching process, a same mask can be used. In addition, it is possible to further reduce the angle of emergence of the light passing through the first light orientation layer. FIG. 3 illustrates an angle of emergence θ' of light passing through the first light orientation layer 102 and the second light orientation layer 105, in a case where the first light orientation layer 102 and the second light orientation layer 105 are provided. The angle of emergence θ' refers, for example, to a maximum angle of emergence after emergent light passing through a midpoint of a side of two adjacent second barriers away from the first barriers, passes through the two adjacent second barriers and the first barriers in a corresponding position. For example, the angle of emergence of the light passing through the second light orientation layer 105 can be adjusted by adjusting a height of the second barriers 1051 and/or the angle of emergence of the light passing through the second light orientation layer 105 can be adjusted by adjusting a distance between two adjacent second barriers 1051. The projection of the first barriers 1021 on the first base substrate 101 may not coincide with the projection of the second barriers 1051 on the first base substrate 101 as well, limitations are not imposed thereto. For example, the angle of emergence θ' can also refer to a maximum included angle of emergent light passing through two adjacent second barriers and two adjacent first barriers corresponding to the two adjacent second barriers.

It should be noted that, in this embodiment, the number of the first barriers 1021 and/or the second barriers 1051 is not limited to the number illustrated in the diagram, which is only schematic description.

For example, a material of the first light orientation layer 102 can include metal (Cr), chromium oxide or a black resin, but is not limited thereto. For example, a material of the second light orientation layer 105 can include metal chromium (Cr), chromium oxide or a black resin, but is not limited thereto.

For example, in the switchable anti-peeping device provided by an example of this embodiment, the first electrode layer 103 can include a planar electrode, the second electrode layer 202 can include a planar electrode, but the first electrode layer 103 and the second electrode layer 202 are not limited to planar electrodes. For example, materials of the first electrode layer 103 and the second electrode layer 202 are both a transparent conductive material, for example, indium tin oxide (ITO), bur are not limited thereto.

For example, in the switchable anti-peeping device provided by an example of this embodiment, the first electrode layer 103 is closer to the light control layer 30 than the first light orientation layer 102. With such arrangement, the first electrode layer 103 can be made closer to the second electrode layer 202, so that the electric field formed by both electrode layers is easier and faster to cause the light control layer to switch to the transparent state. For example, in the switchable anti-peeping device provided by an example, the first light orientation layer 102 and the first electrode layer 103 are located on a same side of the first base substrate 101, an insulating layer 104 is provided between the first light orientation layer 102 and the first electrode layer 103. For example, in the switchable anti-peeping device provided by an example, the first light orientation layer 102 is closer to the first base substrate 101 than the first electrode layer 103, and the insulating layer 104 has a substantially flat surface. For example, a material of the insulating layer can include a resin, but is not limited thereto. When the first light orientation layer 102 and the first electrode layer 103 are located on both sides of the first base substrate 101 respectively, the insulating layer may not be provided.

Figure 5:
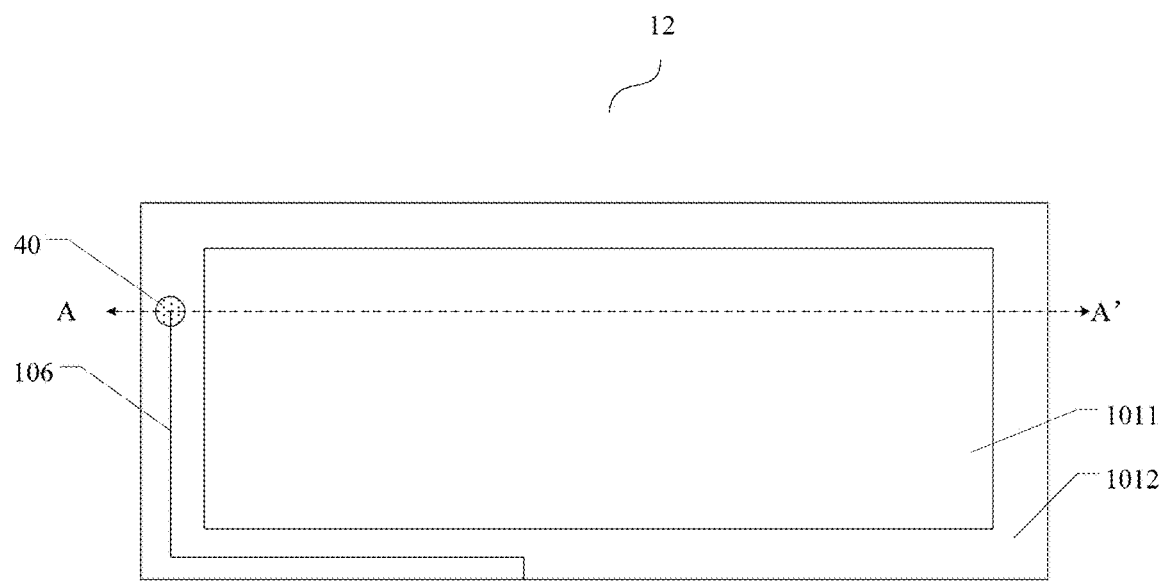
FIG. 5 is a schematic diagram of a first substrate and a second substrate electrically connected through a conductive structure in a switchable anti-peeping device provided by an embodiment of the present disclosure.
Figure 6:
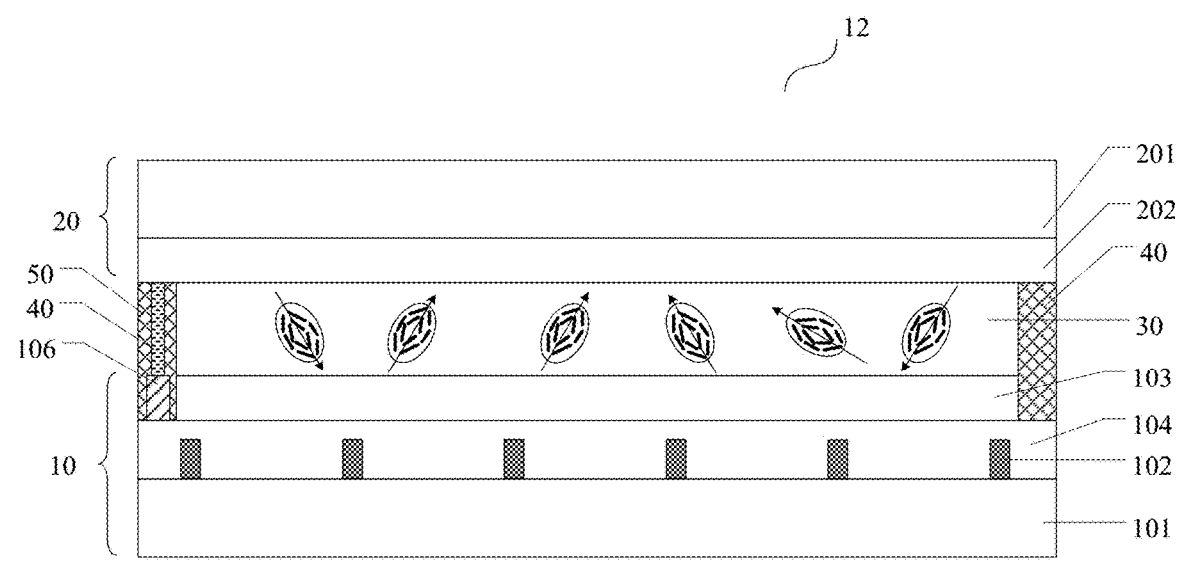
FIG. 6 is a cross-sectional schematic diagram along an A-A' direction in FIG. 5.

For example, as illustrated in FIG. 5 and FIG. 6, in the switchable anti-peeping device provided by an example of this embodiment, the second electrode layer 202 is electrically connected with a wring 106 of the second electrode layer 202 on the first substrate 10 through a conductive structure 40 provided between the first substrate 10 and the second substrate 20, but is not limited thereto. For example, the wring 106 can be provided in a same layer as the first electrode layer 103, but is not limited thereto. For example, the first electrode layer 103 is provided in a display region 1011 of the switchable anti-peeping device, and the wring 106 is provided in a peripheral region 1012 of the switchable anti-peeping device. The peripheral region 1012 can be located on at least one side of the display region 1011, for example, as illustrated in FIG. 5, the peripheral region 1012 can be provided around the display region 1011. The display region 1011 and the peripheral region 1012 of the switchable anti-peeping device correspond to, for example, a display region and a peripheral region of the display panel. For example, the conductive structure 40 can be an anisotropic conductive adhesive, but is not limited thereto. For example, the anisotropic conductive adhesive is non-conductive in a direction parallel to the first base substrate, and is conductive in a direction perpendicular to the first base substrate. For example, the conductive structure 40 can be conductive silver adhesive, but is not limited thereto. For example, it can be electrically connected with the wring 106 on the first base substrate by way of screen printing, but is not limited thereto. A material of the wring 106 can include metal, but is not limited thereto.

For example, as illustrated in FIG. 6, in the switchable anti-peeping device provided by an example of this embodiment, the first substrate 10 and the second substrate 20 can be integrated together by a sealing structure 50. The sealing structure 50 can be, for example, a sealant, but is not limited thereto. The switchable anti-peeping device can integrate the first substrate and the second substrate and the light control layer therebetween together to achieve a better optical effect, and can also save cost.

Second Embodiment

Figure 7A:
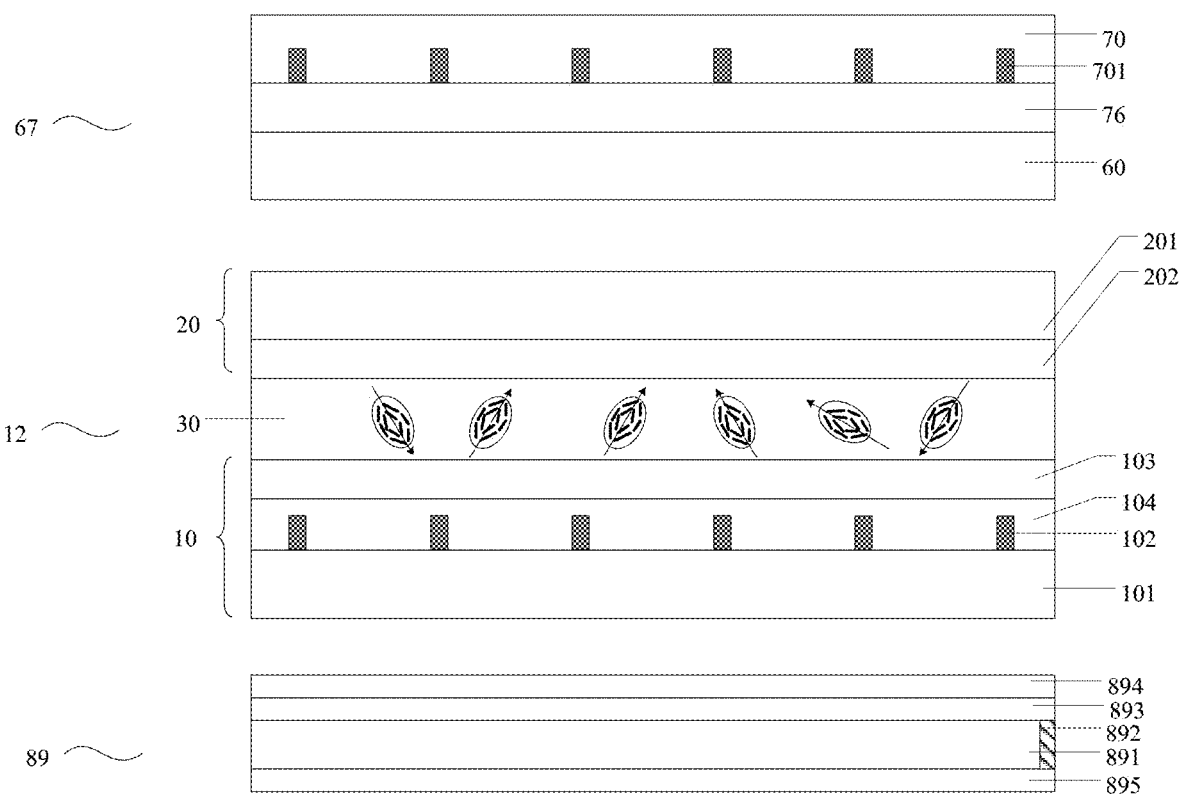
FIG. 7a is a schematic diagram of a display device provided by an embodiment of the present disclosure.

This embodiment provides a display device, as illustrated in FIG. 7a, including a display panel 67, a backlight module 89, and any one of the switchable anti-peeping devices 12 as described in the first embodiment, the switchable anti-peeping device 12 being located between the backlight module 89 and the display panel 67. The backlight module 89 provides backlight for the display panel, and the backlight passing through the switchable anti-peeping device 12, is incident on the display panel 67. Emergent light of the backlight passing through the switchable anti-peeping device 12 corresponds to incident light that is incident on the display panel 67.

For example, in a display device provided by an example, the display panel 67 includes a liquid crystal display panel. For example, a lower substrate 60 can be an array substrate, and an upper substrate 70 can be a color filter substrate, and a liquid crystal layer 76 is sandwiched between the upper substrate and the lower substrate. The array substrate can be provided thereon with a gate line, a data line, a thin film transistor (TFT), and a pixel electrode, etc. The color filter substrate can be provided thereon with a black matrix pattern and a color filter layer, etc. A common electrode can be provided on the array substrate, or can be provided on the color filter substrate. By controlling rotation of the liquid crystal molecules in the display panel, control of light intensity is achieved, and then color image display is achieved, by a color filtering effect of the color filter substrate. However, the liquid crystal display panel is not limited to the above-described structure. For example, the display panel can be of a vertical alignment (VA) display mode, a twisted nematic (TN) display mode, an advanced-super dimensional switching (ADS) display mode, or an in-plane switching (IPS) display mode, which is not limited thereto.

For example, as illustrated in FIG. 7a, in one example, the backlight module 89 can include a light guide plate 891, a light source 892 provided on a side of the light guide plate 891, and a diffusion film 893 and a prism film 894 which are provided on a side of the light guide plate 891 close to the display panel 67. A reflection plate 895 can be further provided on a side of the light guide plate 891 away from the display panel 67. It should be noted that, the backlight module 89 is not limited to the structure as given above.

Figure 7B:
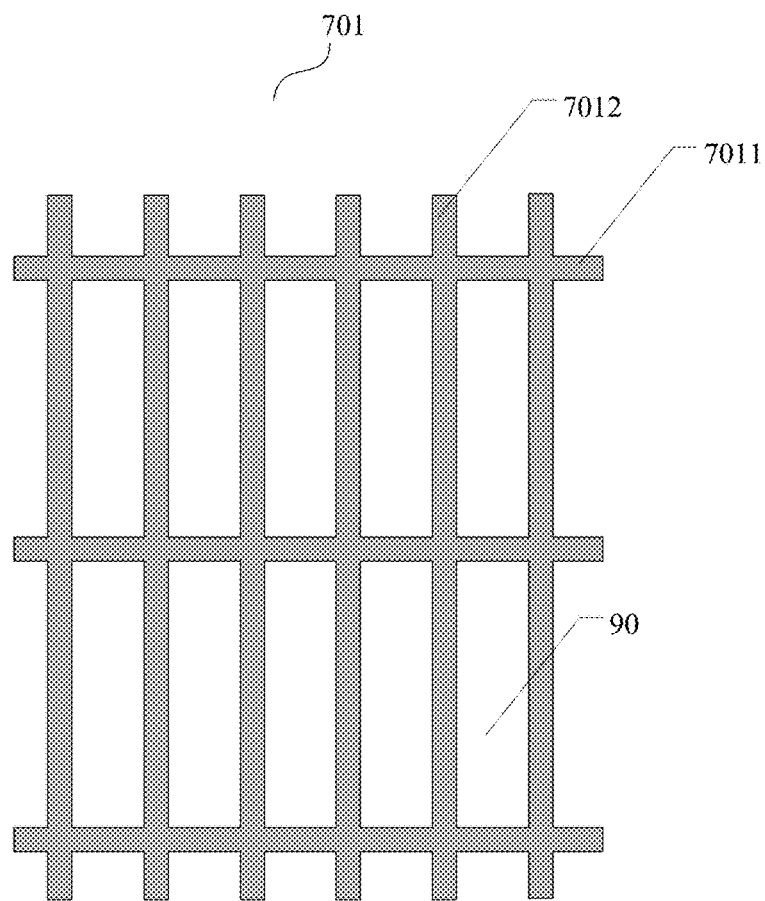
FIG. 7b is a schematic diagram of a black matrix pattern in a display panel of a display device provided by an embodiment of the present disclosure.

For example, in the display device provided by an example of this embodiment, the first light orientation layer 102 includes a plurality of first barriers 1021 (for which FIG. 4 can be referred to) parallel to each other, the upper substrate or the lower substrate can include a black matrix pattern 701 (for which FIG. 7a can be referred to), a projection of the plurality of parallel first barriers 1021 on the first base substrate 101 are located within a projection of the black matrix pattern 701 on the first base substrate 101. For example, as illustrated in FIG. 7b, a plan schematic diagram of the black matrix pattern can include a plurality of first black matrixes 7011 parallel to each other in a lateral direction and a plurality of second black matrixes 7012 parallel to each other in a longitudinal direction, and the lateral direction is perpendicular to the longitudinal direction. For example, a projection of the plurality of parallel first barriers 1021 on the first base substrate 101 are located within a projection of the plurality of parallel second black matrixes 7012 arranged longitudinally of the black matrix pattern 701 on the first base substrate 101, but is not limited thereto. For example, the projection of the plurality of parallel first barriers 1021 on the first base substrate 101 can also be located within a projection of a portion of the plurality of parallel second black matrixes 7012 arranged longitudinally on the first base substrate 101. For example, since the black matrix pattern is mostly provided corresponding to a sub-pixel 90, two adjacent first barriers 1021 can be provided every other one or more columns of sub-pixels, and are not limited thereto. It should be noted that, the column in this embodiment can be replaced by a row. Likewise, the second barrier 1051 in the second light orientation layer 105 can be provided with reference to an arrangement mode of the first barrier 1021 in the first light orientation layer 102.

Figure 8:
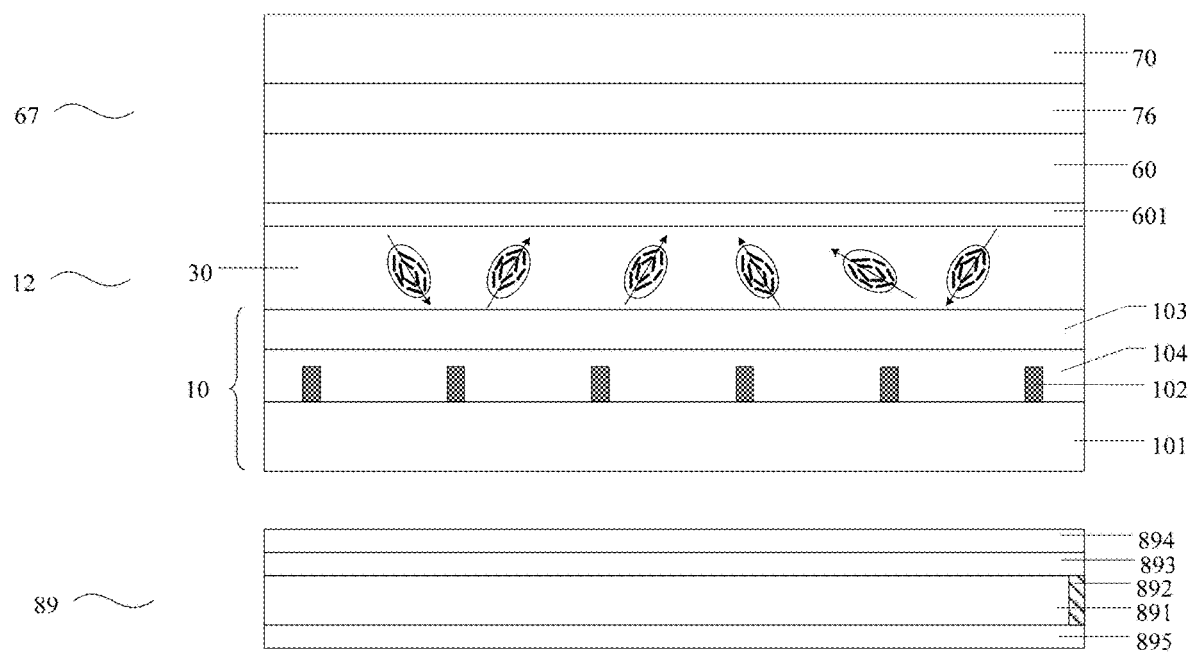
FIG. 8 is a schematic diagram of another display device provided by an embodiment of the present disclosure.

For example, as illustrated in FIG. 8, in the display device provided by an example of this embodiment, the display panel 67 includes an upper substrate 70 and a lower substrate 60, and the lower substrate 60 can also serve as a second base substrate 201 of a switchable anti-peeping device. With such arrangement, a thickness of the entire display device can be further reduced.

For example, as illustrated in FIG. 8, in the display device provided by an example of this embodiment, the lower substrate 60 is provided thereon with a wire grid polarizing film 601, and the wire grid polarizing film 601 can also serve as a second electrode layer 202 of the switchable anti-peeping device. With such arrangement, the thickness of the entire display device can be further reduced. For example, the wire grid polarizing film 601 includes a plurality of parallel metal wires. For example, a width of each of the metal wires can be 30 nm to 50 nm, a distance between two adjacent metal wires can be 100 nm to 150 nm, and a height of each of the metal wires can be 100 nm to 300 nm, but they are not limited thereto. The wire grid polarizing film has properties as follows: with respect to natural light incident on the wire grid polarizing film, linearly polarized light parallel to a direction of the metal wires is almost completely reflected, and linearly polarized light perpendicular to the direction of the metal wires can be transmitted. The wire grid polarizing film, for example, can be used as a lower polarizer of a display panel at the same time. For example, the wire grid polarizing film 601 is a wire grid polarizer (WGP). The wire grid polarizing film 601 has a small gap at a nanometer scale, its effect can be substantially similar to that of a planar electrode, so it can also serve as the second electrode layer 202 of the switchable anti-peeping device.

Third Embodiment

This embodiment provides a manufacturing method of a switchable anti-peeping device, the method including steps of: forming a first light orientation layer 102 and a first electrode layer 103 on a first base substrate 101 to prepare a first substrate 10, the first light orientation layer 102 defining an angle of emergence of light passing through the first light orientation layer 102; and forming a second electrode layer 202 on a second base substrate 201 to prepare a second substrate 20; and providing a light control layer 30 between the first substrate 10 and the second substrate 20, the light control layer 30 being capable of switching between a transparent state and a scattering state.

For the manufacturing method of the switchable anti-peeping device, a liquid crystal display (LCD) production line process can be used, which can utilize the production line's own apparatus and process to a large extent, and reduce product costs.

For example, in one example, the manufacturing method of the switchable anti-peeping device can include following steps.

Firstly, the first substrate 10 is prepared.

Figure 9A:
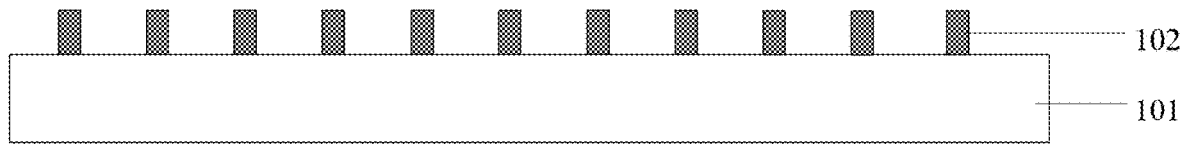
FIG. 9a is a schematic diagram of forming a first light orientation layer on a first base substrate in a manufacturing method of a switchable anti-peeping device provided by an embodiment of the present disclosure.
Figure 9B:
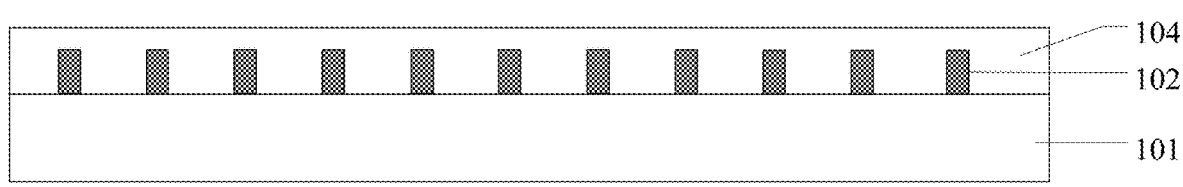
FIG. 9b is a schematic diagram of forming an insulating layer on a first light orientation layer in a manufacturing method of a switchable anti-peeping device provided by an embodiment of the present disclosure.
Figure 9C:
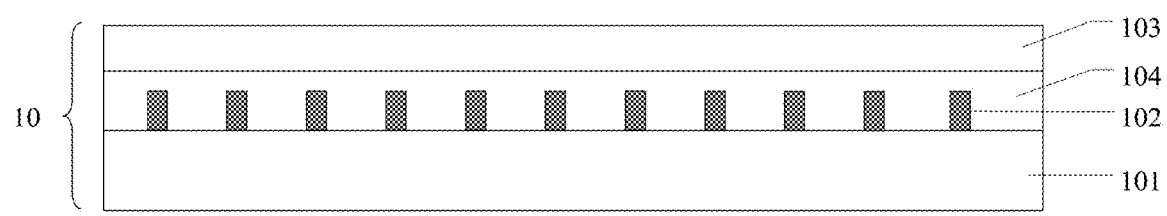
FIG. 9c is a schematic diagram of forming a first electrode layer on an insulating layer in a manufacturing method of a switchable anti-peeping device provided by an embodiment of the present disclosure.

As illustrated in FIG. 9a, the first light orientation layer 102 is formed on the first base substrate 101, the first light orientation layer 102 defines the angle of emergence of the light passing through the first light orientation layer 102; as illustrated in FIG. 9b, an insulating layer 104 is formed on the first light orientation layer 102; and as illustrated in FIG. 9c, a first electrode layer 103 is formed on the insulating layer 104.

Next, the second substrate 20 is prepared.

Figure 10:
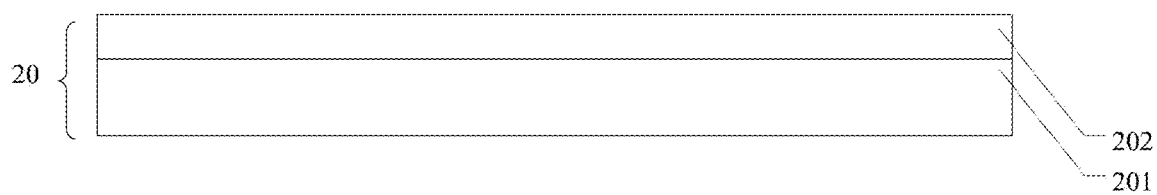
FIG. 10 is a schematic diagram of forming a second electrode layer on a second base substrate in a manufacturing method of a switchable anti-peeping device provided by an embodiment of the present disclosure.

As illustrated in FIG. 10, a second electrode layer 202 is formed on the second base substrate 201.

For example, in the manufacturing method of the switchable anti-peeping device provided by an example of this embodiment, the first light orientation layer 102 can be formed by a photoetching process. For example, in one example, forming the first light orientation layer 102 includes forming a plurality of parallel first barriers 1021.

Figure 11A:
FIG. 11a is a schematic diagram of forming a first light orientation film on a first base substrate in a manufacturing method of a switchable anti-peeping device provided by an embodiment of the present disclosure.
Figure 11B:
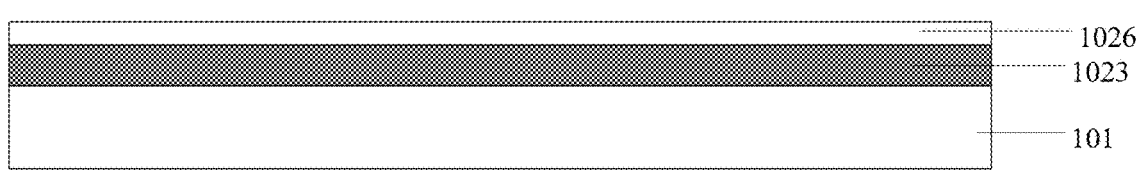
FIG. 11b is a schematic diagram of forming first photoresist on a first light orientation film in a manufacturing method of a switchable anti-peeping device provided by an embodiment of the present disclosure.
Figure 11C:
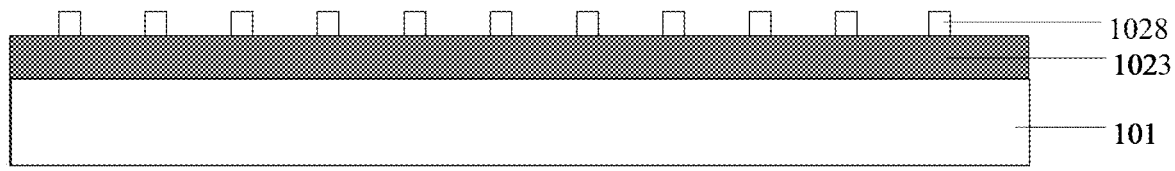
FIG. 11c is a schematic diagram of exposing and developing first photoresist to form patterned first photoresist in a manufacturing method of a switchable anti-peeping device provided by an embodiment of the present disclosure.
Figure 11D:
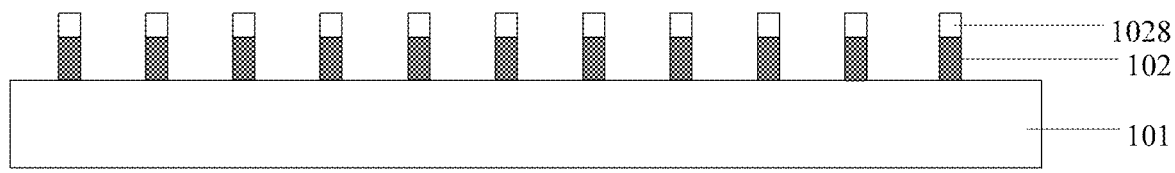
FIG. 11d is a schematic diagram of etching a first light orientation film, with patterned first photoresist as a mask in a manufacturing method of a switchable anti-peeping device provided by an embodiment of the present disclosure.

For example, as illustrated in FIG. 11a to FIG. 11d, in the manufacturing method of the switchable anti-peeping device provided by an example of this embodiment, forming the first light orientation layer 102 by a photoetching process includes steps of: as illustrated in FIG. 11a, forming a first light orientation film 1023 on the first base substrate 101; as illustrated in FIG. 11b, forming first photoresist 1026 on the first light orientation film 1023; as illustrated in FIG. 11c, exposing and developing the first photoresist 1026, to form patterned first photoresist 1028; as illustrated in FIG. 11d, etching the first light orientation film 1023, with the patterned first photoresist 1028 as a mask.

Then, the patterned first photoresist 1028 is stripped off, and the first light orientation layer 102, for example, as illustrated in FIG. 9, can be formed.

For example, negative photoresist can be used for forming the first light orientation layer 102, but is not limited thereto.

It should be noted that, black negative photoresist can be used for forming the first light orientation film 1023, and thus, after the first light orientation film 1023 is exposed and developed, the first light orientation layer 102, for example, as illustrated in FIG. 9, can be obtained.

For example, in the manufacturing method of the switchable anti-peeping device provided by an example of this embodiment, there is further included forming a second light orientation layer 105, the second light orientation layer 105 being formed on the first base substrate 101, and formed on a side of the first base substrate 101 opposite to a side on which the first light orientation layer 102 is formed, and the second light orientation layer 105 defining an angle of emergence of light passing through the second light orientation layer 105. For example, in one example, forming the second light orientation layer 105 includes forming a plurality of parallel second barriers 1051, a projection of the first barriers 1021 on the first base substrate 101 coinciding with a projection of the second barriers 1051 on the first base substrate 101.

For example, in the manufacturing method of the switchable anti-peeping device provided by an example of this embodiment, the second light orientation layer 105 is formed by a photoetching process. For instance, in one example, forming the second light orientation layer 105 by a photoetching process includes steps of: forming a second light orientation film; forming second photoresist on the second light orientation film; exposing and developing the second photoresist to form patterned second photoresist; etching the second light orientation film, with the patterned second photoresist as a mask; stripping the patterned second photoresist, to form the second light orientation layer.

For example, negative photoresist can be used for forming the second light orientation layer 105, but is not limited thereto.

It should be noted that, black negative photoresist can also be used for forming the second light orientation film, and thus, after the second light orientation film is exposed and developed, the second light orientation layer can be obtained. For manufacturing of the second light orientation layer, diagrams illustrating the manufacturing of the first light orientation layer can be referred to.

For example, in this embodiment, for the first light orientation layer 102, the second light orientation layer 105, the light control layer 30, the first electrode layer 103, the second electrode layer 202, the insulating layer 104, the first base substrate 101, and the second base substrate 201, etc., description of the foregoing embodiments can be referred to, which will not be repeated here.

The following is to be noted.

(1) Only the structures involved in the embodiments of the present disclosure are involved in the embodiments and drawings of the present disclosure, other structures can refer to usual designs.

(2) In order to clearly illustrate, a layer or an area may be amplified in the drawings of the embodiments of the present disclosure. It is to be understood that, when a member such as a layer, a film, an area or a substrate is located or disposed on or below another member, the member can be located or disposed on or below the another member directly, or an intermediate member or intermediate member(s) can be disposed.

(3) The features in different embodiments or the features in the same embodiments can be combined without conflict.

(4) the same reference numerals denote the same elements/components unless otherwise defined, What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A display device, comprising a display panel, a backlight module, and a switchable anti-peeping device,
  wherein the switchable anti-peeping device comprises a first substrate and a second substrate provided opposed to each other, and a light control layer located between the first substrate and the second substrate,
  the first substrate comprises a first base substrate, and a first light orientation layer and a first electrode layer which are provided on the first base substrate,
  the second substrate comprises a second base substrate, and a second electrode layer provided on the second base substrate,
  the first light orientation layer defines an angle of emergence of light passing through the first light orientation layer, and the light control layer is capable of switching between a transparent state and a scattering state,
  the first light orientation layer comprises a plurality of first barriers,
  a height of the first barriers limits the angle of emergence of the light passing through the first light orientation layer, and/or a distance between two adjacent first barriers limits the angle of emergence of the light passing through the first light orientation layer,
  the first barriers are configured such that the angle of emergence of the light passing through the first light orientation layer is only limited to 60° or less, and is not greater than 60°,
  the switchable anti-peeping device is located between the backlight module and the display panel, the display panel comprises an upper substrate and a lower substrate, and the lower substrate also serves as the second base substrate of the switchable anti-peeping device, and a wire grid polarizing film is provided on the lower substrate, and the wire grid polarizing film also serves as the second electrode layer of the switchable anti-peeping device.

2. The display device according to claim 1, wherein the first barriers are parallel to each other, the upper substrate or the lower substrate comprises a black matrix pattern, and a projection of the plurality of first barriers on the first base substrate is located within a projection of the black matrix pattern on the first base substrate.

* * * * *